United States Patent [19]
Archer

[11] 3,853,533
[45] Dec. 10, 1974

[54] METHOD FOR FACILITATING THE HARVEST OF FRUIT

[75] Inventor: Milton C. Archer, Olivette, Mo.

[73] Assignee: Monsanto Company, St. Louis, Mo.

[22] Filed: Nov. 19, 1973

[21] Appl. No.: 417,340

[52] U.S. Cl. ................................ 71/104, 260/454
[51] Int. Cl. .......................................... A01n 9/18
[58] Field of Search ................................... 71/104

[56] References Cited
FOREIGN PATENTS OR APPLICATIONS
168,087  2/1965  U.S.S.R. ............................ 71/104

OTHER PUBLICATIONS

Kristian et al., "Synthesis and Properties of Aromatic, etc.," (1966) CA 67 No. 21531 X (1967).

Primary Examiner—Glennon H. Hollrah
Attorney, Agent, or Firm—Arnold H. Cole; Donald W. Peterson; Neal E. Willis

[57] ABSTRACT

The harvest of fruit from bearing trees is facilitated by application of effective concentrations of p-isothiocyanatophenylacetic acid.

10 Claims, No Drawings

METHOD FOR FACILITATING THE HARVEST OF FRUIT

This invention relates to a method for facilitating the harvest of tree fruit. More particularly, it is concerned with the provision of a novel chemical agent which serves to accelerate or enhance the normal abscission process in such fruit.

The commercial growing of edible tree fruit is a major international industry. As expected, those engaged in this industry are concerned about getting their product to the consumer in the most economical manner. Traditionally, the harvesting of fruit crops has been accomplished by hand picking. However, in recent years, shortages of manual laborers have become increasingly more frequent. Coupled with constantly spiraling wages, such shortages have lent impetus to the investigation of alternative harvesting methods.

One result of this investigation has been the development and testing of a wide variety of mechanical devices designed to reduce or limit the need for manual efforts. Said devices have generally been vibrators or shakers which can be driven through the areas where the fruit-bearing trees grow. They attach to the trunk, or to major branches, and are actuated to produce a vibratory motion which either loosens the fruit or causes it to fall to the ground. Certain of these mechanical devices also include means for catching or otherwise collecting the fruit as it falls. Although several types of such devices are now being used, they normally require pretreatment of the fruit with an abscission agent in order to be effective, and they often present a problem by causing damage to whole trees or parts thereof.

According to the present invention, the harvesting of tree fruit is facilitated by applying thereto a chemical agent. Although the mode of action of the chemical on the fruit is not known with certainty, it is found that the treated fruit are more loosely attached to the stem. Removal of such fruit from the tree is thus facilitated, and, indeed, the treated fruit often fall from the tree without the need for an external force, either manual or mechanical.

In practicing the present invention, the particular chemical agent employed is p-isothiocyanatophenylacetic acid. The compound can be prepared by adding thiophosgene to the corresponding amino acid in aqueous hydrogen chloride as described in Chemical Abstracts, 67, 21531$_x$.

The compound of this invention is most advantageously applied to the fruit-bearing plant by spraying. While such application will normally be carried out with ground-based equipment, aerial spray techniques can be empolyed in those instances where a particular crop or cultural practices indicate economic feasibility.

For use in accordance with this invention, said compound may be formulated and applied as a liquid, a dust or a wettable powder following procedures known to the art. The active ingredient is admixed with a suitable inert material serving as a solvent, diluent or dispersant, after which such admixture is further diluted to a desired volume of spray. It will be understood that the composition to be applied can also contain surfactants, wetting agents, emulsifiers, sticking agents or other types of adjuvants whose nature and function have long been recognized in the art.

The method of this invention can be conveniently employed in the treatment of any fruit-bearing trees or plants. Representative of the fruits for which harvest can be thus facilitated are the common table fruit such as apples, plums and cherries, the citrus fruit such as oranges and lemons, along with others such as olives, grapes and nuts. It is particularly preferred to use the compound of the present invention as an aid in the harvesting procedures for the fruit of the non-deciduous trees, citrus and olives.

The time of application will vary from a few days (e.g., 3–4) up to about 2 weeks prior to the planned date of harvest. Specific selection within this short range will be dependent upon the type and variety of fruit being treated and upon the stage of fruit development prior to treatment. These factors will also be considered in the determination of the rate of application. From a practical standpoint, the compound of this invention is applied in a spray concentration of from about 100 to 4,000 ppm. (parts per million) active ingredient in total spray volume. A desirable degree of harvest facilitation is not obtained at lesser concentrations, while higher concentrations detract from economy and may also cause undesired injury to leaves and/or green fruit. Applications at concentrations of from 500 to 2,000 ppm. are particularly preferred.

To illustrate the practice of the method of this invention, tests are conducted to determine the effect of p-isothiocyanatophenylacetic acid on various tree fruit. Branches selected for these tests are those which contain at least 20 pieces of fruit that are to be harvested within the following 2 weeks. The fruit are sprayed with a formulation of the active ingredient described herein, and a number of days after treatment, observations are made of the number of fruit which have fallen to the ground. Fruit which has not fallen is clipped from the branch with the stem attached to the fruit, and measurement is made of the force in pounds required to remove the fruit from the stem on a straight pull. Apparatus for such measurements is described in *Plant Physiology*, Volume 43, Part B, pages 1560–1576 (1968). When the force required to remove the fruit from the stem is too small to be measured on such apparatus, it is designated as "too loose to pull".

In these tests, observations are also made of any adverse effects on any leaves or green fruit which may be present on the branches. The extent of plugging, the removal of a part of the peel or rind when the stem is pulled from the fruit, is similarly noted along with any other indications of fruit injury. Although significant portions of most fruit crops are used for processing into juices, concentrates and canned sections, the remainder must be marketed as fresh fruit. While injuries such as rind pitting, burning or discoloration are not of real concern in the case of processed fruit, such undesirable changes in appearance are detrimental to fresh fruit sales. In addition, injuries such as plugging or rind splitting cannot be accepted for either market since they generally lead to rapid fruit rot.

In the illustrative tests hereinafter presented, it should be understood that untreated control branches are selected in each instance, and corresponding measurements and observations are made on the fruit thereof. The tests also included treatment of branches with cycloheximide, a known fruit abscission agent, at a rate which would normally cause all treated fruit to drop or be too loose for a measurement of pull force.

By noting those instances in which this known compound does not demonstrate its expected activity, conclusions can be drawn as to the validity of a particular test due to the adverse effects of external factors. Some of these external factors include problems with the spraying apparatus which often leads to inadequate or non-uniform application, and rainfall within a few hours after application, which may wash off the chemical treatment.

EXAMPLE I

Spray formulations for this test are prepared by mixing a small quantity (0.5 or 1 gram) of p-isothiocyanatophenylacetic acid in acetone to a total volume of 100 or 200 ml. Then, 10 ml. of surfactant is added, followed by dilution with water to a total volume of 500 ml. The active ingredient in these formulations is thus present at concentrations of 1,000 or 2,000 ppm., and sprays are applied to branches of Valencia oranges. After 7 days, fruit is removed from the test branches, and measurements of pull force are made for at least 10 fruit from each branch. At a concentration of 1,000 ppm., an average pull of 11.9 pounds is required with 30 percent plugging, while at 2,000 ppm., the average pull is 18.1 pounds with 60 percent plugging. The untreated fruit on the control branch requires an average pull of 26.2 pounds, and 90 percent plugging occurs. A few leaves drop from the treated branches, and the fruit show some light burn.

EXAMPLE II

In this test, spray formulations are prepared as described above at concentrations of 500, 1,000, 2,000 and 4,000 ppm., and applications to branches containing Hamlin oranges are made at each rate. After 6 days, the untreated fruit requires an average pull of 16.7 pounds with 90 percent plugging. No loosening is noted at the two lowest concentrations, while the treated fruit is too loose to pull at 2,000 ppm. At the highest concentration, all of the treated fruit falls to the ground before the observation date. Some leaf drop and fruit burn is noted at the higher rates.

EXAMPLE III

Concurrently with the test of Example II, application at the noted rates is also made on branches of the same variety of fruit about 3–4 hours after treatment with a $3 \times 10^{-3}$ molar concentration of 2, 3, 5-triiodobenzoic acid. It has been reported that ethylene is desirable in the abscission zone of plants in order to accelerate the abscission process. Since the triiodobenzoic acid has been found to inhibit the transport of auxins within plants, and since auxins are antagonistic to ethylene production, the pretreatment attempted to minimize auxin interference. After 6 days, the observations made of treated branches indicate some loosening at 500 ppm., but no other changes from the results without triiodobenzoic acid in the preceding Example. It should be noted that a control branch which received only the pretreatment showed no loosening of the fruit.

EXAMPLE IV

About 1 month after the tests of Examples II and III, the smae variety of fruit is treated with p-isothiocyanatophenylacetic acid at rates of 100, 300, 500 and 700 ppm. After 7 days, the treated fruit showed no loosening at any of the four rates, while the untreated fruit required an average pull of 13.1 pounds with 100 percent plugging.

At the same time, tests were also made at the above rates on fruit which were pretreated with $3 \times 10^{-3}$ and $6 \times 10^{-3}$ molar concentrations of 2, 3, 5-triiodobenzoic acid. With the lower concentration of pretreatment, the average pull required is 9.6 pounds at 100 ppm., 12.1 pounds at 300 ppm., 7.6 pounds at 500 ppm., and 4.5 pounds at 700 ppm. The two lowest rates showed 10 percent and 40 percent plugging, respectively. With the more concentrated pretreatment, the fruit was too loose to pull at 500 and 700 ppm., while the average pull required was 6.4 and 7.3 pounds at the 100 and 300 ppm. rates. The only plugging noted was 20 percent at the lowest application rate.

EXAMPLE V

About a month after the test of Example I, the same variety of fruit used therein is treated with p-isothiocyanatophenylacetic acid at rates of 100, 250, 500, 750, 1,000, 2,000 and 4,000 ppm. The fruit on the untreated control branch, after 7 days, required an average pull of 21.7 pounds with 80 percent plugging. The treated fruit showed no loosening at the two lowest rates, and the average pull required at 500 ppm. was 8.5 pounds. The treated fruit was too loose to pull at 750 and 1,000 ppm., and all of the treated fruit had fallen to the ground at the two highest rates. Fruit burn and leaf drop at the highest rate was significantly reduced at the lower rates.

While the invention has been described herein with regard to certain representative examples for purpose of illustrating its practice, it is not to be construed as limited thereto. Those skilled in the art will readily recognize the variations and modifications which can be made without departing from the spirit and scope of this invention.

What is claimed is:

1. A method for facilitating the harvest of fruit which comprises applying an effective concentration of p-isothiocyanatophenylacetic acid to fruit bearing trees within 2 weeks of the date of harvest.

2. A method as defined in claim 1 wherein application is at a concentration of 100 to 4,000 ppm.

3. A method as defined in claim 1 wherein application is at least 3 or 4 days prior to the date of harvest.

4. a method as defined in claim 1 wherein the fruit are citrus or olives.

5. A method as defined in claim 4 wherein the fruit are citrus.

6. A method as defined in claim 1 wherein application is at a concentration of 500 to 2,000 ppm. and is at least 3 or 4 days prior to the date of harvest.

7. A method as defined in claim 6 wherein the fruit are citrus or olives.

8. A method as defined in claim 7 wherein the fruit are citrus.

9. A method as defined in claim 1 wherein application is at a concentration of 500 to 2,000 ppm. and the fruit are citrus or olives.

10. A method as defined in claim 9 wherein the fruit are citrus.

* * * * *